(12) United States Patent
Loomis

(10) Patent No.: US 10,564,297 B2
(45) Date of Patent: Feb. 18, 2020

(54) CORDLESS INERTIAL VEHICLE NAVIGATION WITH ELEVATION DATA INPUT

(71) Applicant: Trimble Inc., Sunnyvale, CA (US)

(72) Inventor: Peter Van Wyck Loomis, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 583 days.

(21) Appl. No.: 14/830,983

(22) Filed: Aug. 20, 2015

(65) Prior Publication Data

US 2017/0052261 A1 Feb. 23, 2017

(51) Int. Cl.
*G01S 19/49* (2010.01)
*G01C 21/20* (2006.01)

(52) U.S. Cl.
CPC ............. *G01S 19/49* (2013.01); *G01C 21/20* (2013.01)

(58) Field of Classification Search
CPC .... G05D 1/0268; G05D 1/027; G05D 1/0278; G05D 1/0212; G05D 1/0276; B60W 2050/0077; B60W 2550/402; G01C 21/165; G01C 21/26; G01C 21/20; G01C 21/005; G01S 19/49

USPC ........................ 342/357.62–357.73
See application file for complete search history.

(56) References Cited

U.S. PATENT DOCUMENTS

| | | | |
|---|---|---|---|
| 6,282,496 B1 | 8/2001 | Chowdhary | |
| 8,150,651 B2 | 4/2012 | Loomis | |
| 8,321,128 B2 | 11/2012 | Park | |
| 8,406,996 B2 | 3/2013 | Loomis | |
| 8,498,793 B1 | 7/2013 | Loomis | |
| 8,532,899 B1 | 9/2013 | Loomis | |
| 8,566,034 B1 | 10/2013 | Loomis | |
| 8,626,441 B2 | 1/2014 | Matthews | |
| 8,893,548 B2 | 11/2014 | Loomis | |
| 2013/0138264 A1* | 5/2013 | Hoshizaki | G01C 21/165 701/1 |
| 2014/0153788 A1* | 6/2014 | Ma | G01C 21/005 382/113 |
| 2014/0297116 A1* | 10/2014 | Anderson | H02K 5/12 701/37 |
| 2015/0127239 A1* | 5/2015 | Breed | B60R 21/0132 701/70 |

* cited by examiner

*Primary Examiner* — Nga X Nguyen
(74) *Attorney, Agent, or Firm* — Kilpatrick Townsend & Stockton LLP

(57) ABSTRACT

Elevation data obtained from a terrain database is a measurement in an inertial navigation system for land vehicles.

20 Claims, 5 Drawing Sheets

CORDLESS INERTIAL VEHICLE NAVIGATION WITH ELEVATION DATA INPUT

TECHNICAL FIELD

The disclosure is generally related to navigation systems for land vehicles.

BACKGROUND

Inertial navigation supplements satellite navigation, especially when satellite signals are weak or obstructed. A global navigational satellite system (GNSS) receiver in a car or truck may have difficulty producing accurate position and velocity estimates near tall buildings or in tunnels, for example.

Many vehicle navigation systems receive sensor inputs from the vehicle in which they are installed. A common example is wheel rotation information sensed at a vehicle wheel and transmitted over a vehicle information bus. However, in some cases it is desirable for a navigation system to be "cordless"; i.e. not to have to rely on a connection to vehicle-supplied information.

One prior art solution ("Cordless inertial vehicle navigation", U.S. Pat. No. 8,406,996) relies on inherent motion constraints of cars and trucks, and uses self-contained barometric altimeter measurements as an input to a navigation filter. That system ignores roll rates, lateral acceleration and vertical acceleration. Despite the success of that approach, further improvements are possible and often desirable for high performance cordless inertial navigation.

DETAILED DESCRIPTION

Figure 1:
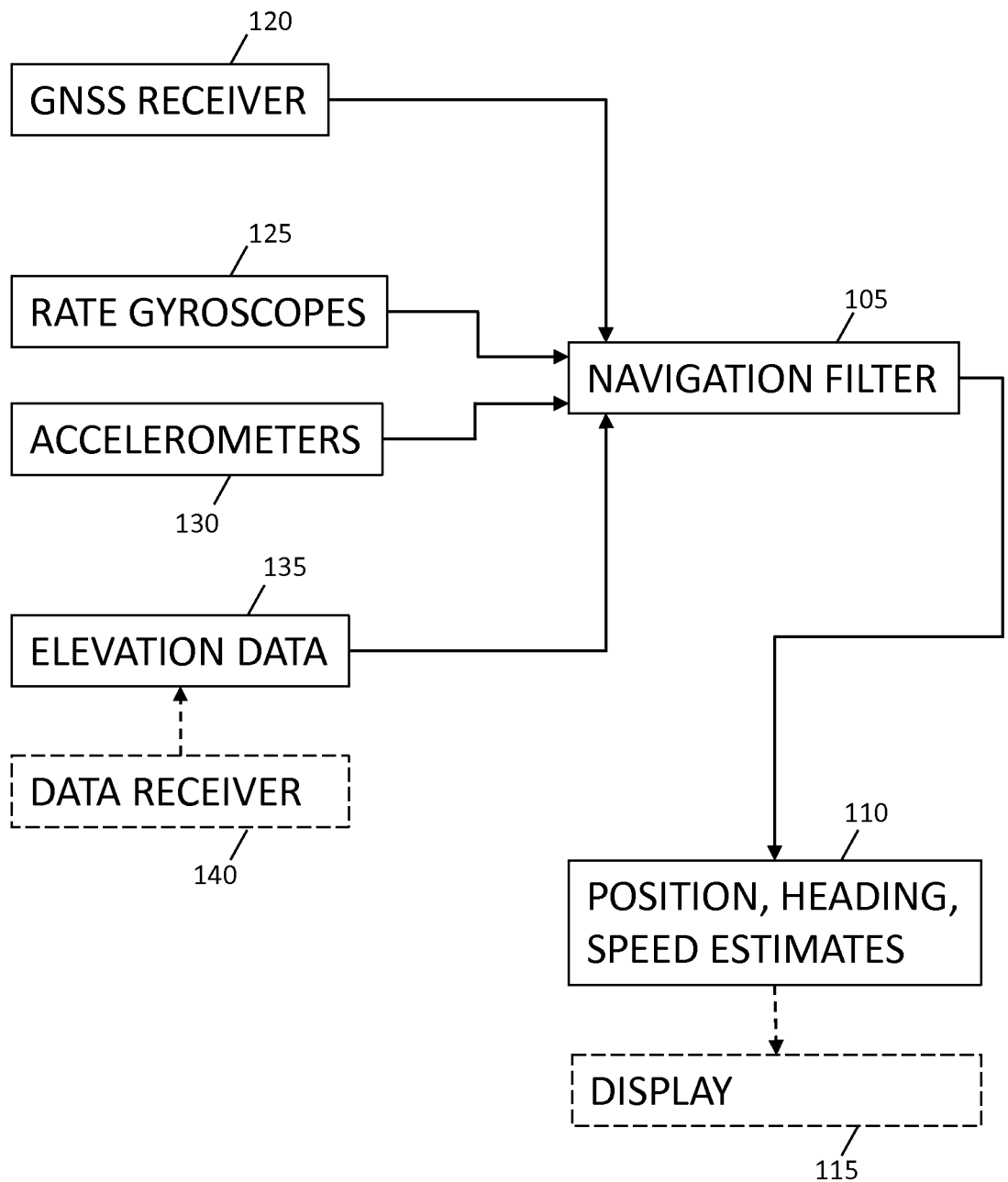
FIG. 1 is a block diagram for a vehicle navigation system with elevation data input.

Cordless inertial vehicle navigation with elevation data input is a navigation solution appropriate for land vehicles, meaning vehicles such as automobiles and trucks that travel on the surface of the earth. The solution includes an elevation database that provides a source of vertical position measurements for a Kalman filter. This and other developments reduce or eliminate small error sources that have been found in prior art solutions through extensive testing.

In particular, three unexpected sources of small errors have been discovered in navigation systems such as those described in "Cordless inertial vehicle navigation", U.S. Pat. No. 8,406,996. First, a no-roll assumption is not always valid for cars and trucks. Second, altitude measurements made in a vehicle cabin may not be reliable. Third, longitudinal accelerometer arm, L, can vary due to sideslip.

Although small, temporary roll rates can occur in cars and trucks due to their soft suspensions. When a roll rate occurs simultaneously with yaw, some of the roll may be observed as a pitch rate. This leads to pitch error and ultimately to positioning error. As a practical example, consider backing and turning out of a parking space. The small rolling motion that occurs when this maneuver is performed in a light cargo van, for example, has been observed to cause altitude errors as large as two meters in an inertial navigation system.

Micro-electromechanical systems (MEMS) pressure altimeters are reasonably accurate sources of barometric data, but their pressure estimates are only as useful as what might be called the "fidelity of the pressure sampling environment." Ideally pressure is sampled from a static port with an opening parallel to significant airflow. In the worst case, the opening is pointed into the airflow and is greatly affected by dynamic pressure of air caused by motion of a vehicle. Open windows or even operation of an air conditioner fan can cause pressure changes in the cabin of a vehicle that are unrelated to elevation changes. The problem is worse at high speeds and can lead to altitude errors of ten meters or more.

When only longitudinal acceleration is measured, and lateral and vertical acceleration are ignored, one must take into account the distance of a longitudinal accelerometer ahead or behind a vehicle's pivot point. This "accelerometer arm", L, affects longitudinal acceleration measurements during turns. The prior art describes a way to compensate for non-zero accelerometer arm but assumes that L is constant. In reality, effective accelerometer arm can change when entering or leaving a turn because of sideslip. In car racing parlance, when a vehicle is "loose" (yaw rate is greater than expected given steerable wheel angle and speed; rear wheels skid; over steer), then effective L is less than actual L when entering a turn. The effect is opposite in a vehicle that is "tight" (front wheels skid; understeer). This kind of error can lead to two or three meters lateral positioning error when entering a turn at highway speeds.

The three error sources just described are eliminated when elevation data input is used with cordless inertial navigation. Inertial navigation depends on accurate rotation rate and acceleration measurements. In particular, rate gyroscopes are used to keep track of the orientation of vertical; i.e. the direction of gravity or the direction to the center of the earth. Since gravitational acceleration (1 g at the surface of the earth, by definition) is usually the largest magnitude sustained acceleration of a land vehicle, small errors in an estimate of vertical become significant when accelerations are integrated once to estimate velocity and again to estimate position. Vehicle attitude errors lead to acceleration (and consequently position) errors, but an independent source of elevation data can be used to limit them.

An elevation database provides terrain height U (above sea level or some other suitable datum) as a function of position (E, N) on the earth's surface; one may write U=h(E, N) where E, N, U are east, north, up dimensions of a local coordinate system. As explained below, for purposes of a Kalman filter, obtaining U from an elevation database is considered to be a measurement on the database.

The structure and operation of a cordless inertial vehicle navigation system with elevation data input are now described in conjunction with the figures. FIG. 1 is a block diagram for such a system.

In FIG. 1, navigation filter 105 produces position, heading and speed estimates 110. These estimates may be rendered on a display 115 or sent to other devices, not shown. Estimates may be transmitted wirelessly to personal mobile devices of occupants of a vehicle, for example. Navigation filter 105 receives inputs from GNSS receiver 120, rate gyroscopes 125, accelerometers 130 and elevation database 135. The database may contain elevation data for a wide area of potential vehicle travel or it may receive pertinent elevation data wirelessly from a larger, stationary elevation database via data receiver 140.

Navigation filter 105 includes a microprocessor and associated memory and input/output facilities. The navigation filter implements a Kalman filter in firmware to synthesize an optimal estimate of vehicle state based on available measurements and a state dynamics model. GNSS receiver 120 may receive signals from satellites of the NAVSTAR global positioning system (GPS), Galileo, Glonass, Beidou and/or other global or regional navigational satellite systems. Rate gyroscopes 125 and accelerometers 130 are preferably MEMS devices having three orthogonal sensing axes each.

Elevation database 135 is an electronic store of elevation information; i.e. height tabulated versus lateral position. As an example, an elevation database may contain road surface height above sea level for a range of east and north coordinates. When an elevation database is queried with a lateral position (E, N), it returns elevation U at that position. A road database returns road height, for example. Only in the last few years have elevation databases become available that have sufficient accuracy and precision to be useful for providing U measurements to a Kalman filter for land vehicle navigation. An example of state-of-the-art elevation data, with accuracy better than about one meter, is HERE HD Map data which provides lane-level precision on roads and highways. ("HERE" is the name of a mapping company.) As discussed further below, an elevation database may also provide tilt ($\theta$, $\phi$) in addition to height (U) data.

In a system such as that of FIG. 1, an elevation database may be stored in memory such as NAND flash memory, or static RAM or ROM, or other memory device. Such a device may have capacity to store global elevation data, or data for only a limited area, a few square miles to hundreds of square miles, for example. If a vehicle equipped with the system of FIG. 1 travels outside an area for which elevation data is stored in database 135, new data may be obtained. Data receiver 135 downloads elevation data on an as-needed basis from an elevation server (not shown). The data receiver may use WiFi, cellular or other wireless data networks to obtain elevation data from an elevation server. Alternatively a data memory card containing elevation data for a certain area (one or more cities or states, as an example) may be plugged into the system of FIG. 1.

Figure 2:
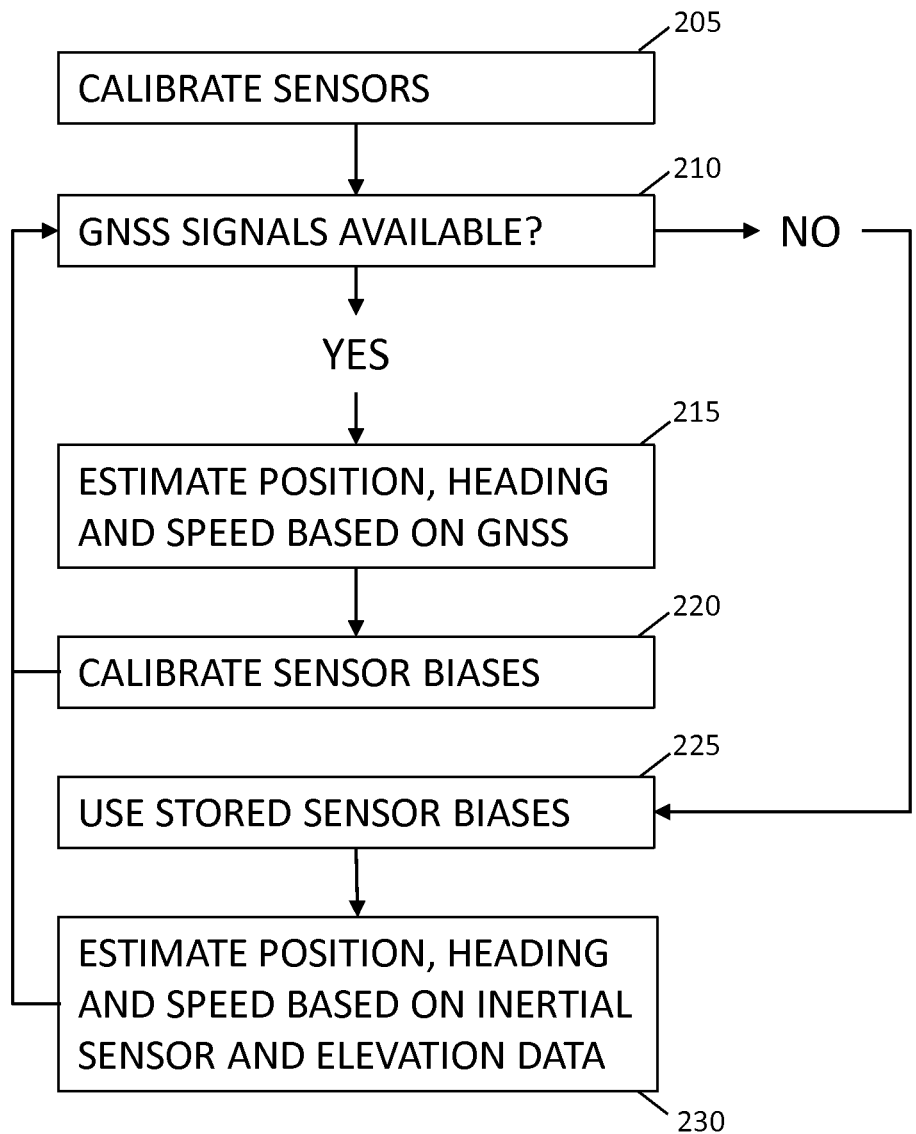
FIG. 2 is a flow chart for overall operation of a vehicle navigation system.

FIG. 2 is a flow chart for overall operation of a vehicle navigation system. The system calibrates its inertial sensors in step 205. If GNSS signals are available (step 210), then vehicle position, heading and speed are estimated based on GNSS data (step 215) and sensor biases are calibrated in step 220. If GNSS signals are not available, such as when travelling through a tunnel, then the system relies on stored sensor biases (step 225) previously determined in step 220. Accelerometer, rate gyroscope and elevation database measurements are combined by a Kalman filter to estimate position, heading and speed without GNSS data in step 230. Further details on estimating sensor biases during changing temperature conditions may be found in "Vehicle navigation system with adaptive gyroscope bias compensation", U.S. Ser. No. 14/676,595, filed on Apr. 1, 2015 and incorporated herein by reference.

Figure 3:
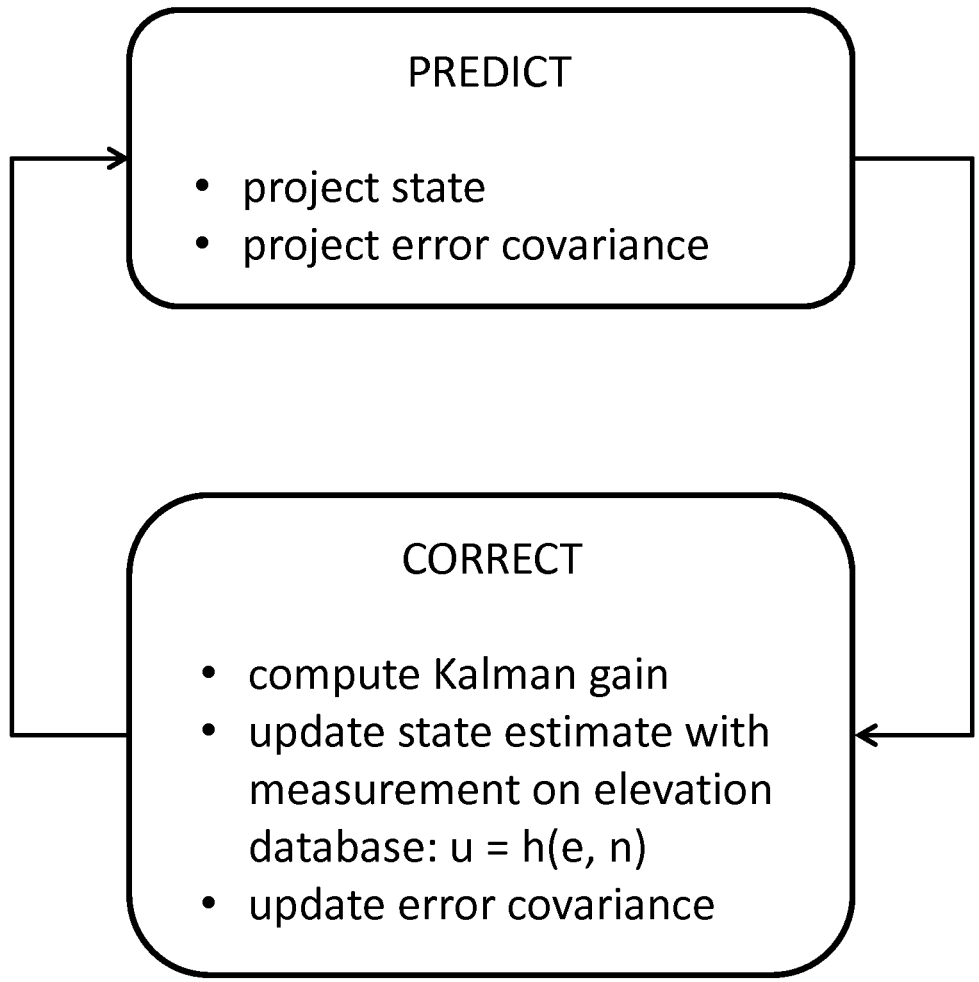
FIG. 3 is a flow chart for a Kalman filter in a vehicle navigation system.

FIG. 3 is a flow chart for a Kalman filter in a vehicle navigation system. The Kalman filter is a loop that includes a prediction step and a correction step. In the prediction step, state variables and their error covariances are projected ahead according to state dynamics equations. In the correction step, measurements are used to update estimates of the state variables. The Kalman gain is also computed and state variable error covariances are updated. At the level of detail shown in FIG. 3, the loop presented in the figure is generic to all Kalman filters, with the exception of the measurement on elevation database h(e, n), discussed below.

The details of a Kalman filter appropriate to cordless inertial vehicle navigation with elevation data input are now described in conjunction with Tables 1-6:

TABLE 1

List of symbols and their meanings.

| Symbol | Meaning |
|---|---|
| L | Local ENU frame |
| B | Body frame |
| B2L | Body frame to local ENU frame |
| L2B | Local ENU frame to body frame |
| $\vec{A}_B^*$ | Accelerometer measurement vector |
| $\Omega_B^*$ | Tait-Bryan rotation matrix containing rate gyro measurements, biases and noise |
| $\psi$ | Denotes yaw axis |
| $\theta$ | Denotes pitch axis |
| $\phi$ | Denotes roll axis |
| $\omega_X$ | Angular rotation rate around the X axis as measured by a rate gyroscope |
| h | Elevation database |
| g | Acceleration due to gravity near the surface of the earth |
| D | Antenna height on a vehicle. |
| X* | Sensor measurement of variable X |
| $\dot{X}$ | $\dfrac{dX}{dt}$ |
| $\beta_X$ | Bias associated with variable X |
| $\upsilon_X$ | Sensor noise associated with variable X |
| $\hat{X}$ | Kalman filter estimate of variable X |

TABLE 2

Kalman filter state variables and dynamics equations.

| State Description | State Variables | State Dynamics Equations |
|---|---|---|
| Position in a local ENU frame | $\vec{x}_L = (e, n, u)$ | $\dot{\vec{x}}_L = \vec{v}_L$ |
| Velocity in a local ENU frame | $\vec{v}_L$ | $\dot{\vec{v}}_L = T_{B2L}(\vec{A}_B^* - \vec{\beta}_A + \vec{v}_v) +$ (0, 0, g) |
| Direction cosine matrix from body to local frame | $T_{B2L} = T_{L2B}^T$ | $\dot{T}_{B2L} = T_{B2L}\Omega_B^*$ |
| Accelerometer bias | $\vec{\beta}_A$ | $\dot{\vec{\beta}}_A = 0 + \vec{v}_A$ |
| Elevation database bias | $\beta_h$ | $\dot{\beta}_h = 0 + v_h$ |
| Yaw rate gyro bias | $\beta_\psi$ | $\dot{\beta}_\psi = 0 + v_\psi$ |
| Pitch rate gyro bias | $\beta_\theta$ | $\dot{\beta}_\theta = 0 + v_\theta$ |
| Roll rate gyro bias | $\beta_\phi$ | $\dot{\beta}_\phi = 0 + v_\phi$ |
| Yaw rate scale factor bias | $\gamma_\psi$ | $\dot{\gamma}_\psi = 0 + v_\psi$ |

TABLE 3

Kalman filter control variables.

| Control Description | Control Variables | |
|---|---|---|
| Rate gyro measurement matrix | $\Omega_B^*$ | Control Variables appear in |
| Accelerometer measurement vector | $\vec{A}_B^*$ | State Dynamics Equations |

TABLE 4

Kalman filter measurement variable and measurement equation.

| Measurement Description | Measurement Variable | Measurement Equation |
|---|---|---|
| Measurement on elevation database, h. | $z_h^* = D = $ const. | $z_h^* = u - h(e, n)$ |

TABLE 5

Kalman filter GNSS measurement variables and measurement equations.

| GNSS Measurement Description | GNSS Measurement Variables | GNSS Measurement Equations |
|---|---|---|
| East | e(GNSS) | $e(GNSS) = E_{GNSS} + \nu_{E_{GNSS}}$ |
| North | n(GNSS) | $n(GNSS) = N_{GNSS} + \nu_{N_{GNSS}}$ |
| Up | u(GNSS) | $u(GNSS) = U_{GNSS} + \nu_{U_{GNSS}}$ |

TABLE 6

Kalman filter GNSS state variables and dynamics equations.

| State Description | State Variables | State Dynamics Equations |
|---|---|---|
| GNSS clock bias | B | $\dot{B} = f$ |
| GNSS clock frequency | f | $\dot{f} = 0 + \nu_f$ |

The state variables for inertial navigation in the Kalman filter presented in Tables 1-6 include position, velocity and attitude of a GNSS antenna on a vehicle, and sensor biases. Vehicle attitude (i.e. yaw, pitch, roll) is represented by a direction cosine matrix, $T_{B2L}$, that represents the orientation of a vehicle body reference frame with respect to a local (east, north, up) coordinate system. Other representations such as Euler angles, Tait-Bryan angles or quaternions are suitable alternatives to the direction cosine matrix. The time rate of change of the direction cosine matrix is proportional to a Tait-Bryan rotation matrix, $\Omega_B^*$, that includes rate gyroscope measurements, biases and noise:

$$\Omega_B^* = \begin{bmatrix} 0 & \gamma_\psi \omega_\psi - \beta_\psi + \nu_\psi & -(\omega_\theta - \beta_\theta + \nu_\theta) \\ -(\gamma_\psi \omega_\psi - \beta_\psi + \nu_\psi) & 0 & \omega_\phi - \beta_\phi + \nu_\phi \\ \omega_\theta - \beta_\theta + \nu_\theta & -(\omega_\phi - \beta_\phi + \nu_\phi) & 0 \end{bmatrix}.$$

The measurement in the Kalman filter presented above is a measurement of vehicle GNSS antenna height. The measurement equation, $z_h^* = u - h(e,n)$, expresses the idea that the height of the antenna above ground is the antenna's u coordinate minus the ground elevation. For example, if the antenna u coordinate is 10 meters and the ground elevation is 8 meters, then the antenna height above the ground is 2 meters. Ground elevation is provided by an elevation database, h(e,n), that returns u given lateral position (e, n).

The measured GNSS antenna height $z_h^*$ is a constant because a land vehicle is assumed not to leave the ground. Intuitively one may appreciate that the database input places a bound on the Kalman filter's estimate for u. This in turn limits the effects of errors in estimates of the orientation of vertical that come from rate gyroscope drift.

The model presented above doesn't include second order effects due to east and north coordinates of a land vehicle antenna being slightly different from (e, n) "under" the antenna when the ground is not level; however, these effects may be accounted for by considering direction cosines between a vehicle's yaw axis and the up unit vector in the local (e, n, u) reference frame. The rotation of the earth, which is less than 0.1 mrad/s, is also not included in the model.

The estimate of the measurement, f, is defined by:

$$f = \hat{u} - h(\hat{e}, \hat{n})$$

The Kalman filter innovation, or measurement minus estimate of the measurement, is:

$$z_h^* - \hat{z} = D - f(\hat{e}, \hat{n}, \hat{u})$$
$$= f(\vec{x}) + \nu_h - f(\hat{x})$$
$$\cong \frac{df}{d\vec{x}}(\vec{x} - \hat{x}) + \nu_h$$
$$\equiv H(\vec{x} - \hat{x}) + \nu_h$$

D, a constant, is the design antenna height on a vehicle, typically 1 to 2 meters. In the equations above, $\hat{x}$ is the estimated position vector ($\hat{e}$, $\hat{n}$, $\hat{u}$) and H is the Kalman observation matrix (a vector in this case), $$\frac{\partial f}{\partial \vec{x}} = \left( -\frac{\partial h(e, n)}{\partial e}, -\frac{\partial h(e, n)}{\partial n}, 1 \right).$$

$\nu_h$ is the noise associated with measurements on the elevation database. If pitch and bank information can't be determined from a database, then one may assume $$H = \frac{\partial f}{\partial \vec{x}} = (0, 0, 1).$$

When GNSS data is available, state variables for position become e(GNSS), n(GNSS) and u(GNSS) where the (e, n, u) coordinate system (a linearized approximation around a latitude, longitude, altitude) is useful, but not an essential choice. If GNSS pseudorange and Doppler measurements are used instead of computed GNSS fixes, then GNSS clock bias and frequency are included in Kalman filter state equations as presented in Table 6.

Figure 4:
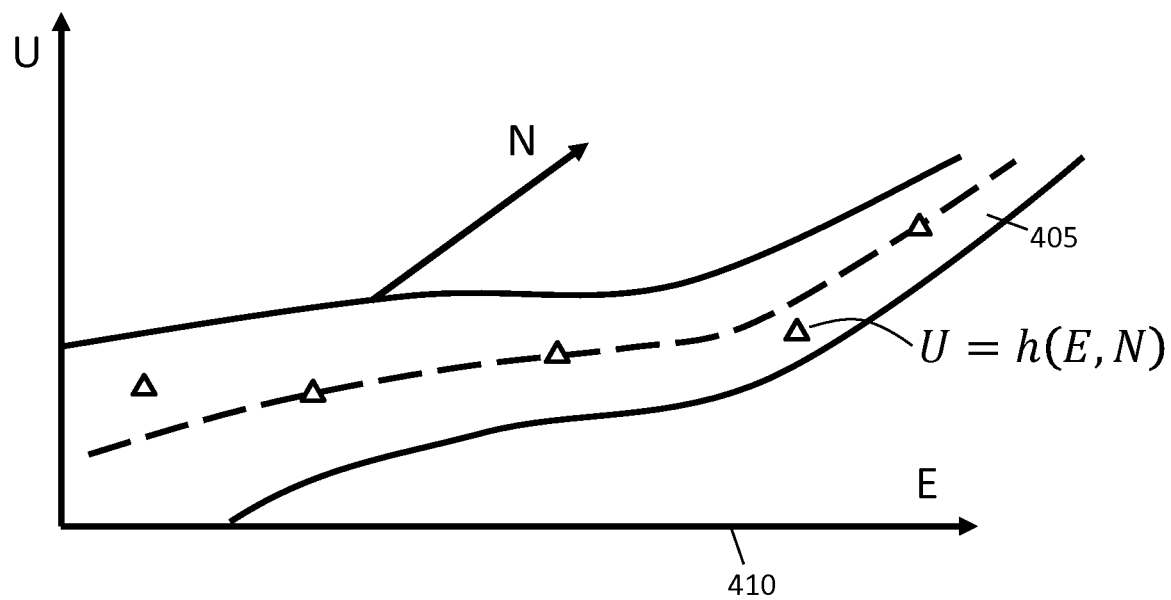
FIG. 4 provides a rendering of elevation data from an elevation database.

FIG. 4 provides a rendering of elevation data from an elevation database. The figure shows a road 405 in an east, north, up coordinate system 410. The small triangles in the figure represent measurements of U given (E, N), expressed as U=h(E, N) where function h represents the operation of a database. In the Kalman filter presented above, the database may be affected by bias and noise. Bias represents constant (or nearly so) errors in the database, while noise represents random errors. Both types of errors are expected to be less than about one meter for state-of-the-art elevation data.

Figure 5:
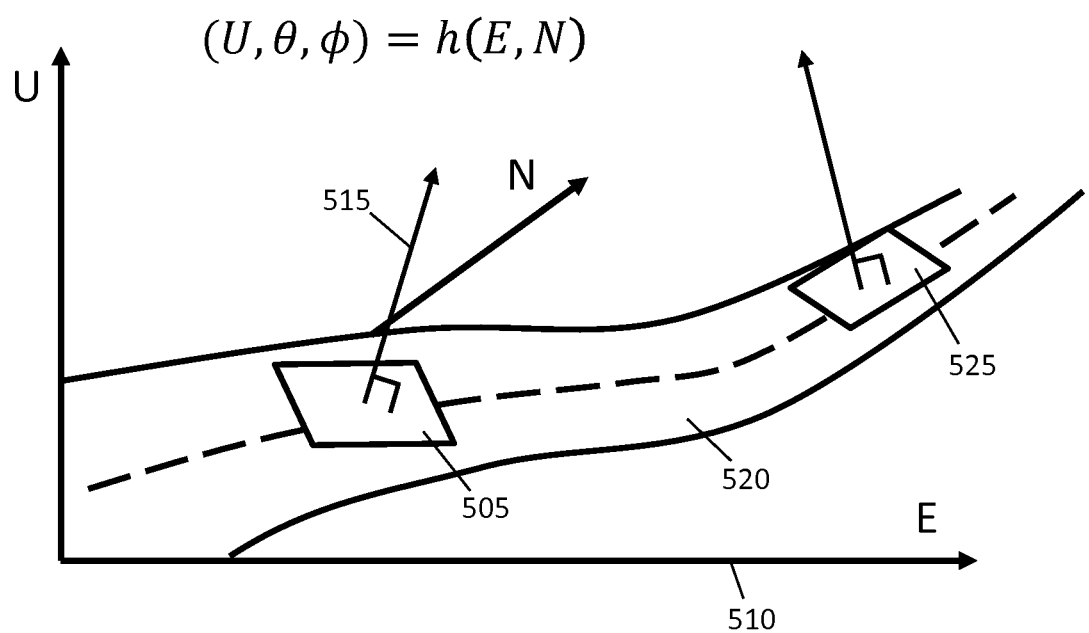
FIG. 5 provides a rendering of elevation and tilt data from an elevation database.

Some elevation databases may provide additional information beyond basic elevation data. FIG. 5 provides a rendering of elevation and tilt data from an elevation database, for example. FIG. 5 shows a small patches 505, 525 of road 520 in an east, north, up coordinate system 510. The small patches represent measurements on the database: given position (E, N) the database returns not only the elevation, U, of the patch of ground, but also its tilt, (θ, φ). In this example, θ is the angle between the U axis and a projection of a normal 515 to the patch of ground on the U–N plane. ϕ is the angle between the U axis and a projection of the normal on the U–E plane. (Clearly, other definitions for tilt angles may be used. Euler angles and quaternions are examples of other systems that may be used to represent the relative orientation of a small patch of ground and a local coordinate system.)

Tilt angles supplied by an elevation database (or computed from elevation data) reveal the sensitivity of elevation measurements to horizontal displacement. If a section of terrain is level, or nearly so, then h(e, n)≅h(e+δ, n+ε) where δ and δ are small displacements. On the other hand if the section of terrain is tilted, then tilt angles $$\theta \sim \frac{\partial h}{\partial n} \text{ and } \phi \sim \frac{\partial h}{\partial e},$$

may be included in a Kalman filter to more accurately compute state variable covariances.

A common situation is a database from which pitch information in the direction of travel along a road ("along track") is provided (or can be computed), but no road bank information is available. In the absence of road bank information, vehicle roll may be averaged over a minute or two to find roll rate gyroscope bias. This procedure is based on the assumption that over long periods of time, the average roll angle of a land vehicle is zero; i.e. on average, it is not rotated away from level about the roll axis.

Map matching, e.g. "snapping" GPS position to the nearest plausible roadway in a database, may be used in conjunction with the techniques described above to further bound lateral position estimates.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A system for estimating a position of a land vehicle, the system comprising:
    a global navigation satellite system (GNSS) receiver;
    a three-axis rate gyroscope;
    a three-axis accelerometer;
    an elevation database storing road surface heights as a function of lateral position on a surface of the earth; and
    a navigation filter communicatively coupled to the GNSS receiver, the three-axis rate gyroscope, the three-axis accelerometer, and the elevation database the navigation filter configured to:
        estimate the position of the land vehicle based on GNSS data received at the GNSS receiver when GNSS signals are available; and
        estimate the position of the land vehicle based on gyroscope data measured by the three-axis rate gyroscope, accelerometer data measured by the three-axis accelerometer, and a road surface height obtained from the elevation database when GNSS signals are not available, wherein the road surface height is returned by the elevation database for an estimated lateral position of the land vehicle on the surface of the earth.

2. The system of claim 1, wherein the elevation database further stores road tilt data and is configured to send a road tilt estimate to the navigation filter.

3. The system of claim 2, the road tilt data comprising along-track road pitch information.

4. The system of claim 3, the road tilt data further comprising road bank information.

5. The system of claim 1, wherein the navigation filter is configured to estimate a constant antenna height of the land vehicle above the road surface height.

6. The system of claim 1 further comprising a data receiver that updates the elevation database with elevation data from an elevation server.

7. The system of claim 1, wherein the navigation filter is configured to calibrate the gyroscope data measured by the three-axis rate gyroscope and the accelerometer data measured by the three-axis accelerometer when GNSS signals are available.

8. The system of claim 1 wherein the three-axis rate gyroscope and the three-axis accelerometer are MEMS devices.

9. The system of claim 1 wherein the navigation filter is configured to send the estimated position of the land vehicle to a display.

10. A method for estimating a position of a land vehicle, the method comprising:
    receiving, at a navigation filter, global navigation satellite system (GNSS) data from a GNSS receiver, gyroscope data from a three-axis rate gyroscope, and accelerometer data from a three-axis accelerometer;
    estimating, using the navigation filter, the position of the land vehicle based on the GNSS data when GNSS signals are available; and
    estimating, using the navigation filter, the position of the land vehicle based on the gyroscope data, the accelerometer data, and a road surface height obtained from an elevation database when GNSS signals are not available, wherein the road surface height is returned by the elevation database for an estimated lateral position of the land vehicle on a surface of the earth.

11. The method of claim 10, wherein the elevation database further stores road tilt data and is configured to send a road tilt estimate to the navigation filter.

12. The method of claim 11, the road tilt data comprising along-track road pitch information.

13. The method of claim 12, the road tilt data further comprising road bank information.

14. The method of claim 10, wherein estimating the position of the land vehicle based on the gyroscope data, the accelerometer data, and the road surface height obtained from the elevation database comprises estimating a constant antenna height of the land vehicle above the road surface height.

15. The method of claim 10, the elevation database is configured to be updated with elevation data from an elevation server.

16. The method of claim 10, further comprising, using the navigation filter, calibrating the gyroscope data measured by the three-axis rate gyroscope and the accelerometer data measured by the three-axis accelerometer when GNSS signals are available.

17. The method of claim 10 wherein the three-axis rate gyroscope and the three-axis accelerometer are MEMS devices.

18. The method of claim 10 further comprising sending the estimated position of the land vehicle to a display.

19. The system of claim 1, wherein the estimated lateral position of the land vehicle on the surface of the earth comprises north and east coordinates.

20. The method of claim 10, wherein the estimated lateral position of the land vehicle on the surface of the earth comprises north and east coordinates.

* * * * *